US010608295B1

(12) United States Patent
Ci et al.

(10) Patent No.: US 10,608,295 B1
(45) Date of Patent: Mar. 31, 2020

(54) SMART BATTERY AND SMART BATTERY SYSTEMS

(71) Applicant: Nova Greentech, Inc., Omaha, NE (US)

(72) Inventors: Song Ci, Omaha, NE (US); Qiangwen Wang, Fremont, CA (US)

(73) Assignee: Nova Greentech, Inc., Omaha, NE (US)

( * ) Notice: Subject to any disclaimer, the term of this patent is extended or adjusted under 35 U.S.C. 154(b) by 809 days.

(21) Appl. No.: 15/091,428

(22) Filed: Apr. 5, 2016

(51) Int. Cl.
*H01M 2/26* (2006.01)
*H01M 10/42* (2006.01)
*H01M 10/48* (2006.01)

(52) U.S. Cl.
CPC ......... *H01M 10/4257* (2013.01); *H01M 2/26* (2013.01); *H01M 10/482* (2013.01); *H01M 10/486* (2013.01); *H01M 2010/4271* (2013.01); *H01M 2010/4278* (2013.01)

(58) Field of Classification Search
CPC .. H01M 10/4257; H01M 2/26; H01M 10/482; H01M 10/486; H01M 2010/4271; H01M 2010/4278
See application file for complete search history.

(56) References Cited

U.S. PATENT DOCUMENTS 3,777,247 A * 12/1973 Zellmer ................ H02J 7/0054 320/140
2017/0353042 A1* 12/2017 Liu .................. H01M 10/4257

* cited by examiner

*Primary Examiner* — Robert S Jones
*Assistant Examiner* — Victoria H Lynch
(74) *Attorney, Agent, or Firm* — Suiter Swantz pc llo

(57) ABSTRACT

Smart batteries and smart battery systems are disclosed. A smart battery may include an energy-storage unit providing a cathode tab and an anode tab. The smart battery may also include a circuit integrated with the energy-storage unit. The circuit may be configured to provide electrical connections to the cathode tab and the anode tab of the energy-storage unit to an external device; measure a current, a voltage, a temperature, and/or an internal resistance of the energy-storage unit; control an input/output property of the energy-storage unit; and establish a data connection with the external device.

14 Claims, 2 Drawing Sheets

SMART BATTERY AND SMART BATTERY SYSTEMS

TECHNICAL FIELD

The present invention relates to the field of electrical power supply and particularly to systems and methods for providing battery based electrical power supplies.

BACKGROUND

Batteries are essential for operations of data centers, server farms, electric vehicles and the like. A conventional battery typically includes multiple battery cells wired in a manner that satisfies certain requirements. Conventional batteries, however, are not dynamically adjustable and are not designed to handle rapidly changing operating environment.

SUMMARY

Accordingly, an embodiment of the present disclosure is directed to a battery. The battery may include an energy-storage unit providing a cathode tab and an anode tab. The battery may also include a circuit integrated with the energy-storage unit. The circuit may be configured to provide electrical connections to the cathode tab and the anode tab of the energy-storage unit to an external device; measure a current, a voltage, a temperature, and/or an internal resistance of the energy-storage unit; control an input/output property of the energy-storage unit; and establish a data connection with the external device.

An additional embodiment of the present disclosure is directed to a battery system. The battery system may include a network of smart batteries. Each smart battery may include an energy-storage unit providing a cathode tab and an anode tab. Each smart battery may also include a circuit integrated with the energy-storage unit. The circuit may be configured to provide electrical connections to the cathode tab and the anode tab of the energy-storage unit to an external device; measure a current, a voltage, a temperature, and/or an internal resistance of the energy-storage unit; control an input/output property of the energy-storage unit; and establish a data connection with the external device.

Another embodiment of the present disclosure is directed to a battery. The battery may include a battery cell having a cathode tab and an anode tab. The battery may also include a built-in circuit integrated into the battery cell. The built-in circuit may be configured to provide electrical connections to the cathode tab and the anode tab of the battery cell to an external device; measure a current, a voltage, a temperature, and/or an internal resistance of the battery cell; control an input/output property of the battery cell; and establish a data connection with the external device.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Embodiments in accordance with the present disclosure are directed to smart batteries and battery systems configured utilizing such smart batteries.

Figure 1:
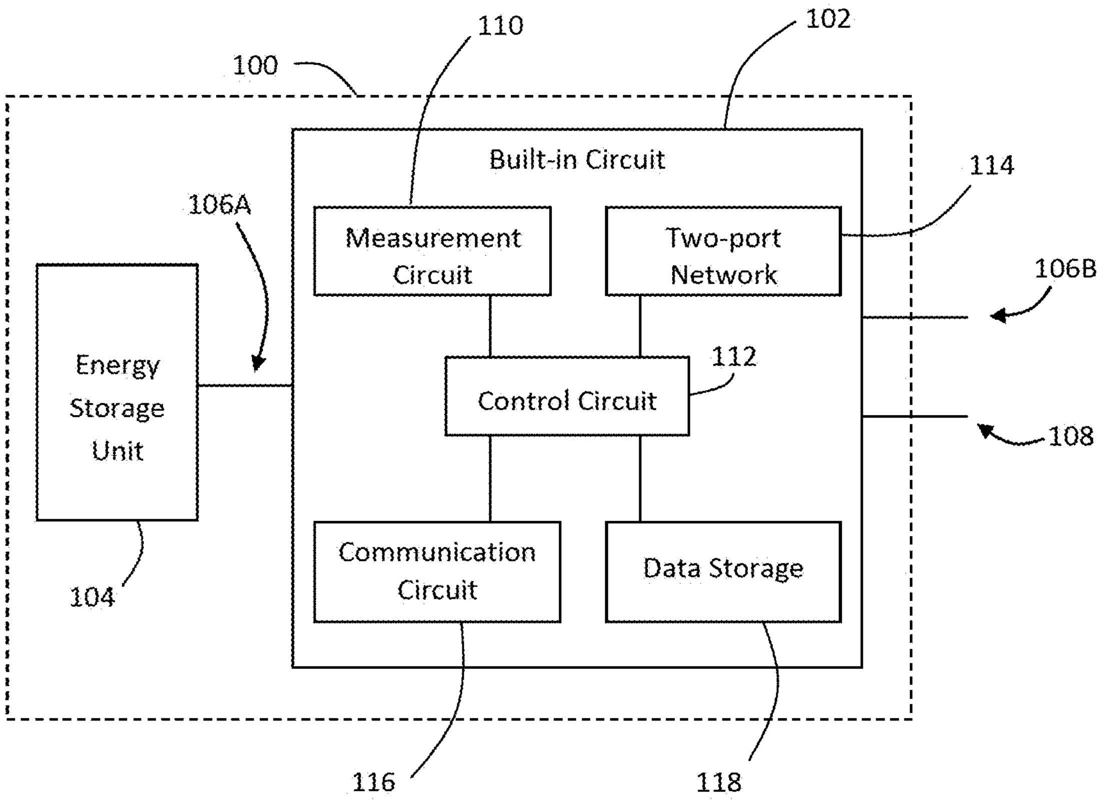
FIG. 1 is a block flow diagram depicting an exemplary smart battery with an integrated circuit.

Referring to FIG. 1, a block diagram illustrating a smart battery 100 configured in accordance with an embodiment of the present disclosure is shown. The smart battery 100 may include a built-in circuit 102 and an energy-storage unit (e.g., a battery cell) 104. The battery cell 104 may include electrode tabs (e.g., a cathode tab and an anode tab) 106A, which may be connected directly to the built-in circuit 102 using various types of mechanical connections and/or various types of soldering techniques. Establishing direct electrical connections as such may provide the built-in circuit 102 the abilities to measure certain parameters of the battery cell 104. For instance, the built-in circuit 102 may include a measurement circuit 110 configured to measure parameters such as the current, the voltage, and/or the internal resistance of the battery cell 104. The measurement circuit 110 may also be configured to measure other parameters, including, for example, temperatures at one or more locations inside the battery cell 104 (or the smart battery 100 in general). It is contemplated that the measurements may be carried out periodically, continuously, intermittently, in response to a predetermined event, in response to a request or command issued by an external device, or combinations thereof.

The measurement results may be provided to a control circuit 112. In some embodiments, the control circuit 112 may be configured to include a computing circuit capable of computing state and operating data of the battery cell 104 based on the measurement results received. The state and operating data of the battery, as well as the measurement results, may be stored in a data storage device 118. The information stored in the data storage device 118 may be utilized for various purposes, including control, analysis, diagnostics, and the like.

The built-in circuit 102 may also include a two-port network 114 configured to control the input/output property of the battery cell 104. For instance, the control circuit 112 of the smart battery 100 may conditionally configure the two-port network 114 so that the electrode tabs 106A of the battery cell 104 can be electrically connected to the electrode tabs 106B of the built-in circuit 102 in a first order to release (output) power via the electrode tabs 106B. The control circuit 112 of the smart battery 100 may also conditionally configure the two-port network 114 so that the electrode tabs 106A of the battery cell 104 can be electrically connected to the electrode tabs 106B of the built-in circuit 102 in a second order (e.g., opposite to the first order) to receive (input) power via the electrode tabs 106B. The control circuit 112 of the smart battery 100 may further configure the two-port network 114 to adjust the current and/or the voltage being released and/or received by the battery cell 104. Additionally and/or alternatively, the control circuit 112 of the smart battery 100 may configure the two-port network 114 in a manner so that the electrode tabs 106A of the battery cell 104 can be electrically disconnected from the electrode tabs 106B of the built-in circuit 102, effectively disconnecting the battery cell 104 electrically from any devices connected to the smart battery 100.

The circuit 102 may further include a data communication circuit 116 configured to facilitate data communication between the smart battery 100 and other device(s) connected to one or more signal ports 108 of the smart battery 100. In some embodiments, the data communication circuit 116 may be configured to only facilitate data upload from the smart battery 100 to the other device(s) connected to one or more signal ports 108 of the smart battery 100. In some embodiments, the data communication circuit 116 may be configured to facilitate data exchange between the smart battery 100 and the other device(s) connected to one or more signal ports 108 of the smart battery 100. It is contemplated that smart batteries 100 configured in accordance with embodiments of the present disclosure may join other smart batteries 100 to form a network, providing each smart battery 100 with on-demand access to the network and allowing each smart battery 100 to store and/or to retrieve energy as needed.

Figure 2:
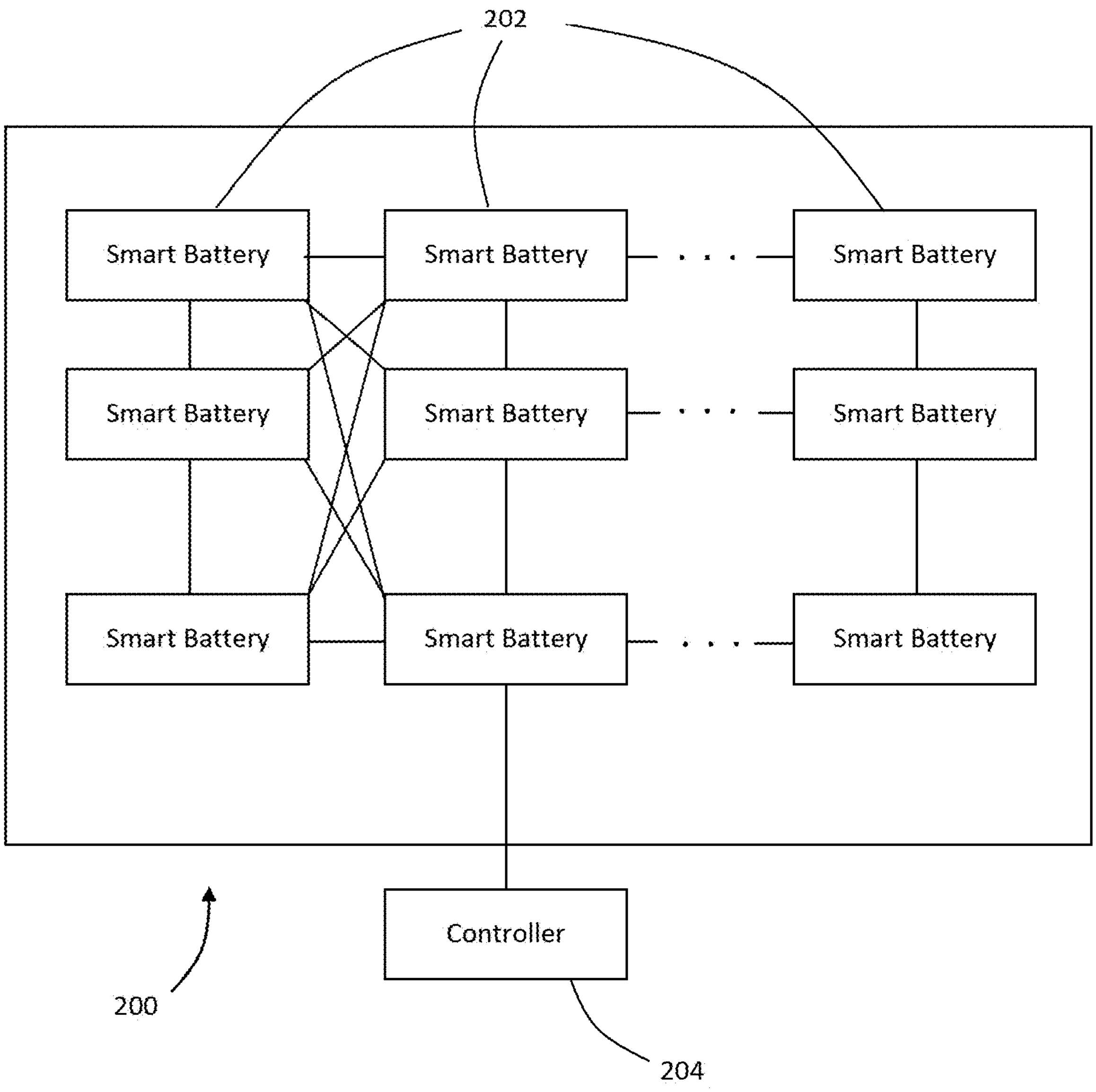
FIG. 2 is a block diagram depicting an exemplary smart battery system including a network of smart batteries.

FIG. 2 is a block diagram depicting a network 200 of smart batteries 202, which may be jointly referred to as a smart battery system 200. It is contemplated that smart batteries 202 may be connected in various manners to form the smart battery system 200. It is noted that while a meshed network of smart batteries 202 is shown in FIG. 2, a meshed network configuration is merely exemplary and is not meant to be limiting. It is contemplated that the smart battery system 200 may implement various other types of network topologies, including a fully meshed network, a ladder network or the like, without departing from the spirit and scope of the present disclosure.

It is also contemplated that the circuit of each smart battery 202 may exchange data with other circuits in the smart battery system 200 and jointly determine (e.g., implementing a distributed computing system) whether any adjustment is needed with regards to power distribution among the various smart batteries 202. For example, if a particular smart battery 202 is overheating, the circuit of that particular smart battery 202 may be instructed to disconnect the battery cell of that particular smart battery 202 from the smart battery system 200. In another example, if the circuit of a particular smart battery 202 determines that the battery cell of that particular smart battery 202 is fully charged, the circuit of that particular smart battery 202 may also disconnect the battery cell of that particular smart battery 202 from the smart battery system 200. It is to be understood that the examples described above are merely exemplary and are not meant to be limiting. It is contemplated that the circuits of the various smart batteries 202 may be configured to perform various actions at least partially based on the measured parameters and/or commands received from external devices without departing from the spirit and scope of the present disclosure.

It is also contemplated that the circuits of the various smart batteries 202 do not have to form a distributed computing system. Alternatively, the circuits of the various smart batteries 202 may only need to report the measured parameters to one or more dedicated controllers 204 on the network, which may carry out the process to help determine whether any adjustment is needed. In another alternative implementation, a subset of the circuits may be dedicated to carry out this process without departing from the spirit and scope of the present disclosure.

It is further contemplated that the various circuits described in the examples above are not required to be associated with each individual battery cell. In some embodiments, the energy-storage unit 104 depicted in FIG. 1 may include more than one individual battery cells. Such an energy-storage unit 104 may be referred to as a battery pack, and the circuit 102 may be coupled to the energy-storage unit 104 and form a smart battery 100 in manners similar to that described above without departing from the spirit and scope of the present disclosure.

It is to be understood that the present disclosure may be conveniently implemented in forms of a hardware/firmware/software package. Such a package may be a computer program product which employs a computer-readable storage medium including stored computer code which is used to program a computer to perform the disclosed function and process of the present disclosure.

It is to be understood that while the built-in circuit described above is shown to have multiple component circuits, such a depiction is merely for illustrative purposes and is not meant to be limiting. It is contemplated that the various component circuits may be further divided in to sub-component circuits, or they may be integrated into a single component without departing from the spirit and scope of the present disclosure.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description. It is also believed that it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A battery, comprising:

an energy-storage unit including a cathode tab and an anode tab; and a circuit integrated with the energy-storage unit, the circuit configured to:

provide electrical connections to the cathode tab and the anode tab of the energy-storage unit to an external device;

measure at least one of: a current, a voltage, a temperature, or an internal resistance of the energy-storage unit;

control an input/output property of the energy-storage unit; and establish a data connection with the external device, wherein the circuit integrated with the energy-storage unit includes a two-port network, the two-port network is configured to control the input/output property of the energy-storage unit by connecting the cathode tab and the anode tab of the energy-storage unit with electrode tabs of the battery by connecting with the cathode tab and the anode tab with the electrode tabs of the battery in a first order to release power via the electrode tabs of the battery and connecting with the cathode tab and the anode tab with the electrode tabs of the battery in a second order to receive power via the electrode tabs of the battery.

2. The battery of claim 1, wherein the circuit of the battery jointly forms an energy network with circuits of other batteries.

3. The battery of claim 2, wherein the circuit is configured to facilitate exchange of power and data with the circuits of the other batteries over the energy network.

4. The battery of claim 1, wherein the energy-storage unit is a single battery cell.

5. The battery of claim 1, wherein the energy-storage unit includes a plurality of battery cells.

6. The battery of claim 1, wherein the circuit is further configured to compute a state and operating data of the energy-storage unit.

7. The battery of claim 1, wherein the circuit is further configured to store at least one of: the current, the voltage, the temperature, the internal resistance of the energy-storage unit, the state, or the operating data of the energy-storage unit.

8. A system, comprising:

a network of smart batteries, each smart battery comprising:

an energy-storage unit providing a cathode tab and an anode tab; and a circuit integrated with the energy-storage unit, the circuit configured to:

provide electrical connections to the cathode tab and the anode tab of the energy-storage unit to an external device;

measure at least one of: a current, a voltage, a temperature, or an internal resistance of the energy-storage unit;

control an input/output property of the energy-storage unit; and establish a data connection with the external device, wherein the circuit integrated with the energy-storage unit includes a two-port network, the two-port network is configured to control the input/output property of the energy-storage unit by connecting the cathode tab and the anode tab of the energy-storage unit with electrode tabs of the battery by connecting with the cathode tab and the anode tab with the electrode tabs of the battery in a first order to release power via the electrode tabs of the battery and connecting with the cathode tab and the anode tab with the electrode tabs of the battery in a second order to receive power via the electrode tabs of the battery.

9. The system of claim 8, wherein the circuit is configured to facilitate exchange of power and data with the circuits of the other smart batteries within the network of smart batteries.

10. The system of claim 8, further comprising:

a controller in communication with the network of smart batteries, the controller configured to control power distribution among the various smart batteries within the network of energy-storage units.

11. The system of claim 8, wherein the energy-storage unit of each smart battery is a single battery cell.

12. The system of claim 8, wherein the energy-storage unit of each smart battery includes a plurality of battery cells.

13. The system of claim 8, wherein the circuit is further configured to compute a state and operating data of the energy-storage unit.

14. The system of claim 8, wherein the circuit is further configured to store at least one of: the current, the voltage, the temperature, the internal resistance of the energy-storage unit, the state, or the operating data of the energy-storage unit.

* * * * *